US006990336B2

(12) United States Patent
Parisi

(10) Patent No.: US 6,990,336 B2
(45) Date of Patent: Jan. 24, 2006

(54) MOBILE REPORTING MODULE EMPLOYING TIMING AND MESSAGE CONSOLIDATION TO ECONOMIZE TRANSMISSIONS

(75) Inventor: Mark Parisi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 689 days.

(21) Appl. No.: 09/997,966

(22) Filed: Nov. 29, 2001

(65) Prior Publication Data

US 2003/0100305 A1 May 29, 2003

(51) Int. Cl.
H04Q 7/20 (2006.01)

(52) U.S. Cl. ............... 455/421; 455/435.1; 455/456.5; 455/517; 340/993

(58) Field of Classification Search .......... 455/435.1, 455/426.1, 422.1, 421, 432.1, 517, 456.1, 455/456.6, 456.5, 456.2, 67.11; 340/988, 340/989, 993, 991, 686.1, 686.6, 425.5, 903, 340/566; 180/167, 169
See application file for complete search history.

(56) References Cited

U.S. PATENT DOCUMENTS

| 6,055,426 A | 4/2000 | Beasley ............... 455/432.1 |
| 6,311,060 B1 * | 10/2001 | Evans et al. ............ 455/426.1 |
| 2003/0100305 A1 * | 5/2003 | Parisi .................... 455/435 |

FOREIGN PATENT DOCUMENTS

WO 01/54044 7/2001

OTHER PUBLICATIONS

Sohrabi K. et al., "Protocols for Self-Organization of a Wireless Sensor Network" IEEE Personal Communications, IEEE Communications Society, US, vol. 7, No. 5, Oct. 2000, pp. 16-27.

* cited by examiner

Primary Examiner—Rafael Perez-Gutierrez
(74) Attorney, Agent, or Firm—Philip Wadsworth; Bruce W. Greenhaus; Richard A. Bachand

(57) ABSTRACT

A remote, electronic, mobile reporting module conserves wireless transmissions in its reporting to a monitoring facility. The time at which certain messages are sent is used to convey added information. Also, when coverage is unknown, the remote module incorporates data into a coverage query in order to save the need to subsequently transmit the data in the event the monitoring facility confirms coverage.

13 Claims, 4 Drawing Sheets

MOBILE REPORTING MODULE EMPLOYING TIMING AND MESSAGE CONSOLIDATION TO ECONOMIZE TRANSMISSIONS

BACKGROUND OF THE INVENTION

I. Field of the Invention

The present invention concerns a method for conserving wireless transmissions of a remote electronic reporting module to a monitoring facility. In order to reduce wireless transmissions of the remote module, the send time is used to convey added information. Also, when coverage is unknown, the remote module incorporates data with a coverage query in order to skip the need to subsequently transmit the data in the event the monitoring facility confirms coverage.

II. Description of the Related Art

QUALCOMM INCORPORATED has been in the trailer-tracking business for over a decade and has installed over 25,000 tethered TrailerTRACS® units that send trailer-management data via the OmniTRACS® mobile communications system. QUALCOMM also provides a cellular-untethered solution to complement the tethered product. Both products use stealth-mounted mobile communications technology to provide reporting of trailer location and operational events.

When a trailer is coupled to its tractor cab, the OmniTRACS/TrailerTRACS system provides features including (1) reporting positive tractor/trailer ID with every connect and disconnect, (2) providing real-time position reports, (3) recording events that occur with respect to the trailer, (4) recording various events' location, date, and time, and (5) the ability to upgrade feature sets in the field.

When the trailer is uncoupled from its tractor ("untethered"), nationwide cellular communications is provided using MICROBURST technology of AERIS.NET. In this condition, a TrailerTRACS unit sends automatic GPS-based trailer position reports, provides optional load sensor reports, tells whether the trailer is empty or not empty, reports door open/closed, and records each event's location, date, and time. Depending upon battery type and environmental factors, the TrailerTRACS unit can operate in its untethered state for at least one month. During this time the TrailerTRACS unit performs various power management and battery diagnostics.

Although remote monitoring systems such as the OmniTRACS and TrailerTRACS products provide a significant advance and enjoy significant commercial success today, QUALCOMM engineers continually endeavor to improve the performance and efficiency of such mobile communications systems. Clearly, conservation of battery power is a concern since the TrailerTRACS product transmits messages even when the trailer is uncoupled to its tractor, and has no other power source. Accordingly, one area of possible focus among QUALCOMM development engineers is decreasing the number and length of messages transmitted by the TrailerTRACS product without sacrificing any richness in data reporting.

SUMMARY OF THE INVENTION

Broadly, the present invention concerns a data collection system, with one or more mobile reporting modules that provide reports to a monitoring facility. In one embodiment, TrailerTRACS mobile monitoring units are configured to report the condition of freight trailers and their cargo and provide representative reports to the monitoring facility via wireless communications networks. Advantageously, the "send" time of certain messages is used to convey added information. For instance, registration messages that the mobile reporting module sends at even minutes past the hour (such as 9:02) indicate that the mobile reporting module has found coverage to be available, whereas messages at odd minutes past the hour (such as 9:03) indicate that coverage availability is unknown. This saves transmission bandwidth which would otherwise be invoked to advise the monitoring facility of coverage availability.

Another transmission conserving feature is that, when conditions prompt the mobile reporting module to send data but coverage is unknown, the remote module sends a coverage query appended by the data in order to skip the need to subsequently transmit the data in the event the monitoring facility confirms coverage. Thus, when the monitoring facility acknowledges coverage, this also serves to acknowledge receipt of the data.

The foregoing features may be implemented in a number of different forms. For example, the invention may be implemented to provide a method to operate a mobile reporting module to conduct efficient communications with a monitoring facility by invoking the timing and/or consolidation of message transmission. In another embodiment, the invention may be implemented to provide an apparatus such as a mobile reporting module and/or monitoring facility programmed to communicate as described herein. In still another embodiment, the invention may be implemented to provide a signal-bearing medium tangibly embodying a program of machine-readable instructions executable by a digital data processing apparatus to conduct operations as discussed herein. Another embodiment concerns logic circuitry having multiple interconnected electrically conductive elements configured to conduct operations as discussed herein.

The invention affords its users with a number of distinct advantages. Chiefly, by reducing the length and number of transmissions from mobile reporting modules to their monitoring facility, the invention saves the mobile reporting module's valuable battery power. This also has the effect of reducing any congestion of communications frequencies. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Hardware Environment

Figure 1:
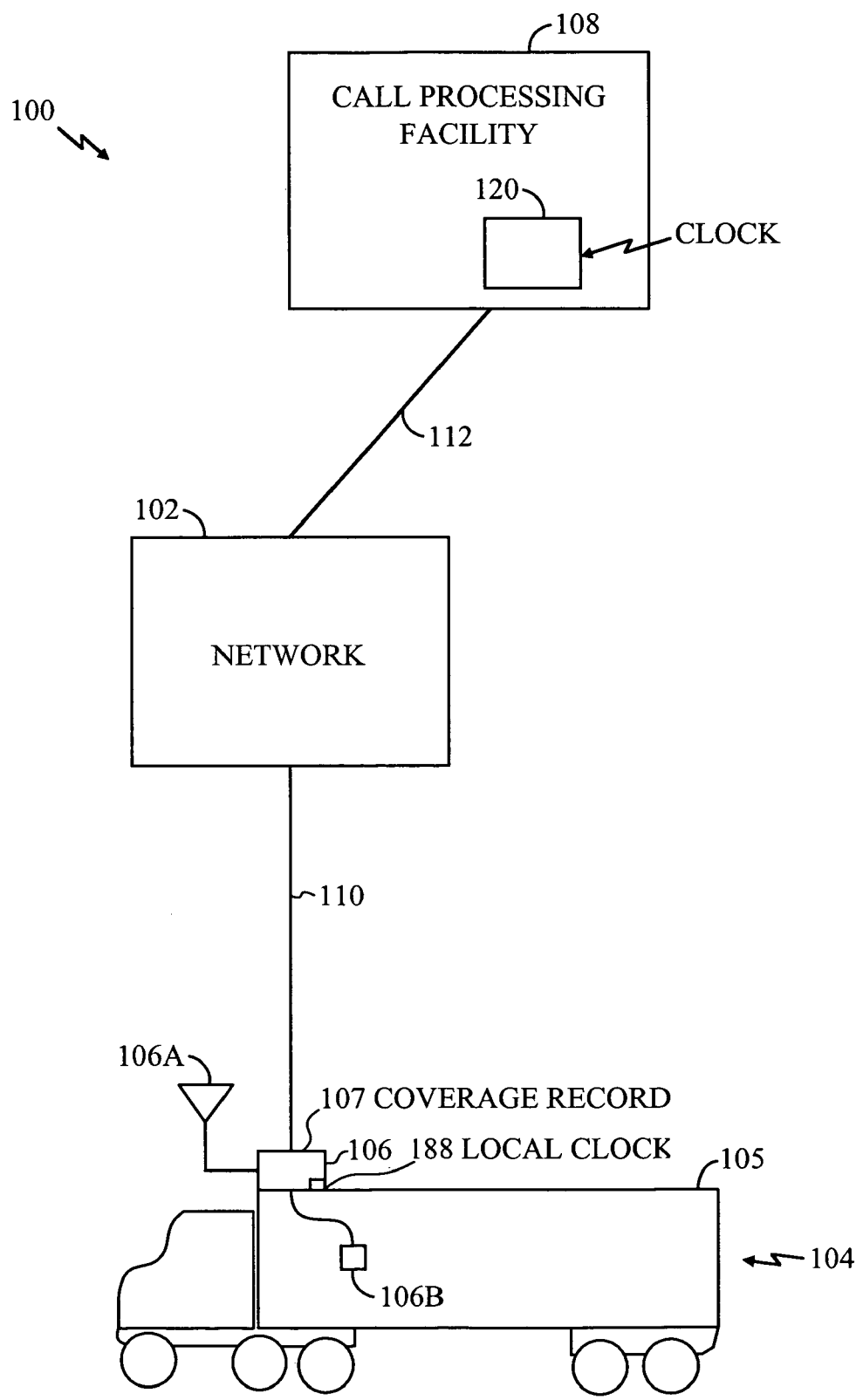
FIG. 1 is a block diagram of the hardware components and interconnections of the hardware environment of the invention.

FIG. 1 depicts an exemplary hardware environment 100 for use of the present invention. A mobile reporting module 106 prepares various status messages concerning the status of some equipment being monitored by the module 106. The mobile reporting module 106 comprises an electronic module with some computing capability, and may be implemented in various forms as discussed below. In the illustrated example, the mobile reporting module 106 is installed at a freight truck 104 having a trailer 105, although freight trucks are merely one example, as the mobile reporting module 106 may be implemented to monitor other types of equipment.

The mobile reporting module 106 includes one or more sensors 106b to monitor conditions of the trailer 105 and the module 106 itself such as: door open/close event, cargo events, latitude, longitude, battery condition or tampering, condition of the module 106, software version of the module 106, etc. The sensors 106b may comprise sensors as utilized in the commercially available TrailerTRACS system of QUALCOMM, INC. Some exemplary types of sensors 106b include global positioning system (GPS) units, door ajar sensors, acoustic cargo sensors, motion detectors, voltage/current sensors, etc.

Another component of the module 106 is a local clock 188. The clock 188 comprises a battery-driven timer, and may be implemented by known varieties of timing devices. The mobile reporting module 106 also includes a transceiver 106a, for exchanging messages with a message processing facility 108 via a communication network 102. As an example, the transceiver 106a may comprise equipment as found in the TrailerTRACS product of Qualcomm Incorporated. When the mobile module 106 initiates a communication, it is coupled to the network 102 by a wireless connection 110. The network 102 completes the call by forming another connection 112 (wireless or otherwise) coupling the call processing facility 108 to the network 102. The call processing facility 108 includes computing equipment to receive, interpret, and otherwise process incoming calls from mobile reporting modules 106.

The mobile reporting module 106 additionally includes a storage device 107 for storing various information pertaining to the operation of module 106, including a coverage record. The coverage record contains information indicating whether or not a particular geographic area is covered by a wireless service provider, such as a cellular telephone service provider. Each mobile reporting module 106 maintains such a record, based on a historical success or failure of communications with various networks 102, as to whether coverage has been arranged with such networks. Each network identifies itself by broadcasting a "coverage code", which is received by module 106 compared to the coverage record. The coverage record may indicate that the just-received coverage code corresponds to an area which is known to have "good" coverage, no coverage, or that the status of coverage is unknown, based upon previous results of communication efforts by module 106 in the past.

An example of the coverage record appears below in TABLE 1. In this example, due to previous success in communicating with the facility 108 via the network identified by coverage code A01, the mobile reporting module 106 has self-noted this network coverage as being "good." Due to a previous failure in communicating with the network identified by coverage code A02, the module 106 has marked this network coverage as "bad." Not having communicated previously with the network identified by coverage code A99, the module 106 has marked this coverage as "unknown," which is a default value for the entire table.

TABLE 1

EXEMPLARY EMPIRICAL COVERAGE RECORD

| COVERAGE CODE | HISTORICAL SIGNIFICANCE OF COVERAGE CODE | | |
|---|---|---|---|
| | GOOD | BAD | UNKNOWN |
| A01 | X | | |
| A02 | | X | |
| ... | | | |
| A99 | | | X |

Although other approaches may be used, the environment 100 may avoid the costs of a full-blown voice cellular service by utilizing a network 102 with specialized facilities for conducting brief, non-voice transmissions. One example is the MICROBURST technology developed by AERIS.NET, INC. of San. Jose, Calif. The MICROBURST technology is a commercially available product for sending short data packets over the control channels of existing cellular networks, and provides an economical conduit between the cellular infrastructure and remote data transceivers, such as module 106. MICROBURST coverage is dictated by agreements with cellular companies and then coordinates distribution channels, such as service providers with vertical market expertise, to take advantage of an evolving nationwide, virtual network. AERIS.NET maintains and operates the virtual network and a nationwide MICROBURST hub, which acts as the network intelligence. The AERIS service, among other benefits, enables the mobile reporting units 106 to communicate with the facility 108 using a cellular transceiver, but without the need to occupy any voice channels.

Facilities of the call processing facility 108 include computing equipment to receive, interpret, and act upon messages transmitted by the mobile reporting module 110. In one embodiment, the facility 108 includes a local clock 120.

Exemplary Digital Data Processing Apparatus

Figure 2:
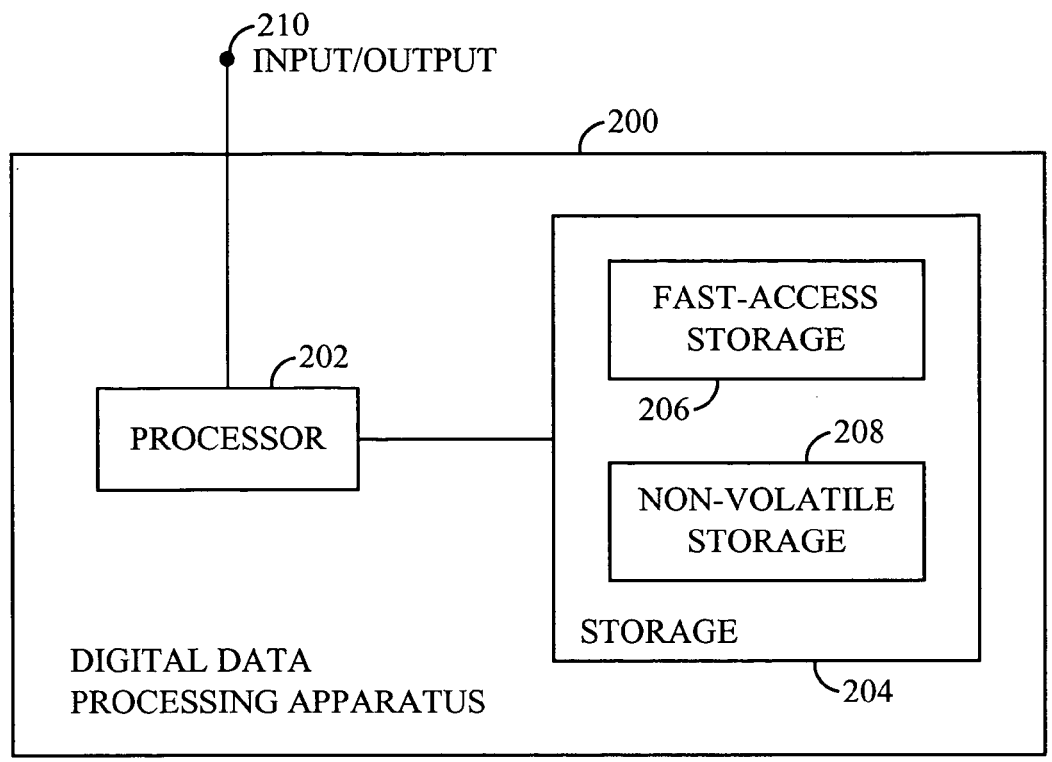
FIG. 2 is a block diagram of a digital data processing machine according to the invention.

As mentioned above, the mobile reporting module 106 and monitoring facility 108 may be implemented in various forms. As one example, each of these components may comprise a digital data processing apparatus, as exemplified by the hardware components and interconnections of the digital data processing apparatus 200 of FIG. 2.

The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive", a tape drive, or any other suitable storage device for storing the programming instructions, as well as other types of data necessary for the operation of apparatus 200. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement the mobile reporting module. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

OPERATION

Having described the structural features of the present invention, the method aspect of the present invention will now be described. As mentioned above, the method aspect of the invention generally involves the wireless transmission of reports, messages, and data from various mobile reporting modules to a monitoring facility, and more particularly, various techniques to reduce the number and time of these transmissions. Although the present invention has broad applicability to data collection systems, the specifics of the structure that has been described is particularly suited for use by mobile monitoring stations for sensing the condition of freight trailers and their cargo and providing representative reports to the monitoring facility via wireless communications networks, and the explanation that follows will emphasize such an application of the invention without any intended limitation.

Signal-Bearing Media

In the context of FIG. 1, such a method may be implemented, for example, by operating the mobile reporting module 106 and monitoring facility 108, each as embodied by a digital data processing apparatus 200, to execute respective sequences of machine-readable instructions. These instructions may reside in various types of signal-bearing media. In this respect, one aspect of the present invention concerns signal-bearing media embodying programs of machine-readable instructions executable by digital data processors to perform the functions of the mobile reporting module 106 and monitoring facility 108 as described herein.

Figure 3:
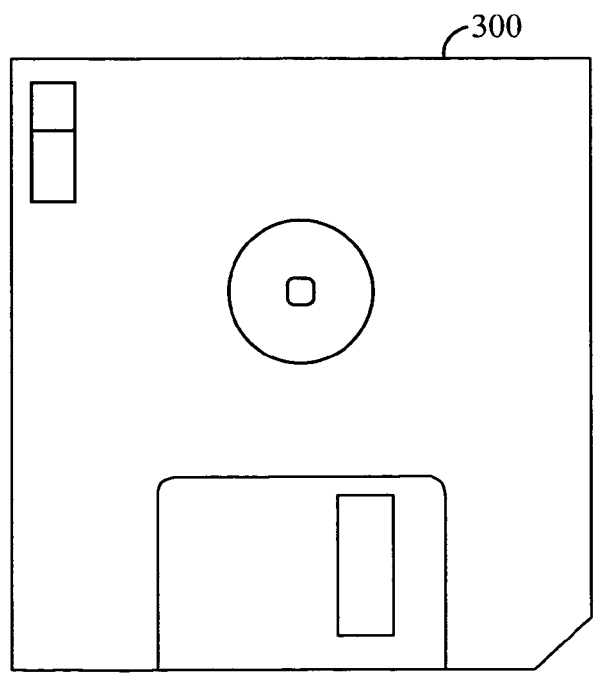
FIG. 3 shows an exemplary signal-bearing medium according to the invention.

This signal-bearing media may comprise, for example, RAM (not shown), as represented by the fast-access storage 206. Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media. Some examples include as direct access storage (e.g., a conventional "hard drive", redundant array of inexpensive disks ("RAID"), or another direct access storage device ("DASD")), serial-access storage such as magnetic or optical tape, electronic read-only memory (e.g., ROM, EPROM, or EEPROM), optical storage (e.g., CD-ROM, WORM, DVD, digital optical tape), paper "punch" cards, or other suitable signal-bearing media including analog or digital transmission media and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the mobile reporting module 106 and/or monitoring facility 108, and is configured to perform operations to implement the method of the invention. The logic circuitry may be implemented using many different types of circuitry, as discussed above.

Operating Sequence—Transmission Timing

Figure 4:
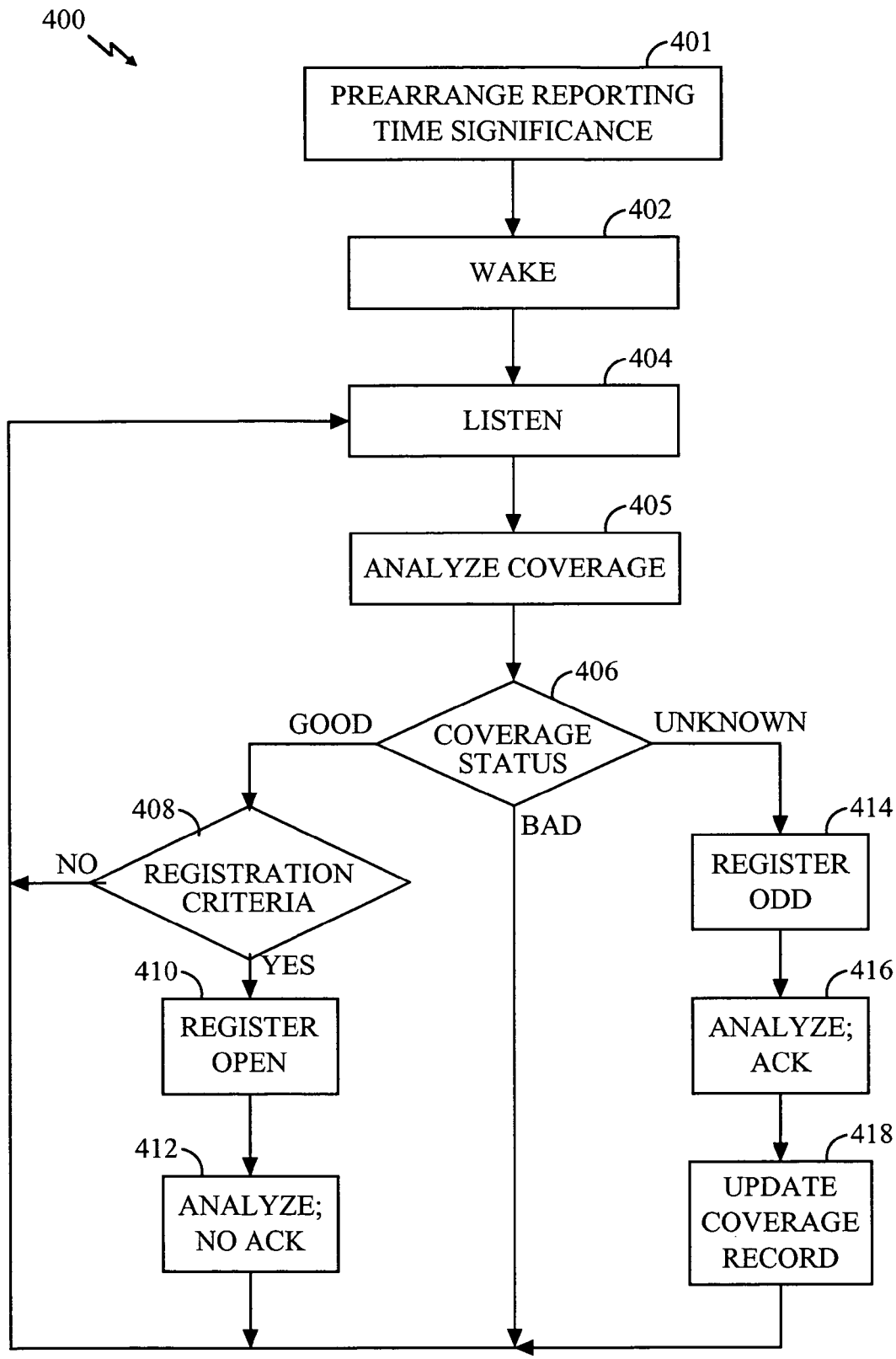
FIG. 4 is a flowchart of an operating sequence for registration timing to convey coverage evaluation, according to the invention.

FIG. 4 shows a sequence 400 to illustrate one example of the method aspect of the present invention. This sequence 400 describes a process for communications between a mobile reporting module 106 and a monitoring facility 108, where the send time of certain messages is used to convey added information. For ease of explanation, but without any intended limitation, the example of FIG. 4 is described in the context of FIGS. 1–3, described above.

In step 401, the module 106 and monitoring facility 108 prearrange the significance of various reporting times to be used in future reports by the module 106. Namely, to save transmission time and bandwidth, certain additional information will be assumed according to the time at which the module 106 reports to the facility 108. The prearrangement of step 401 includes various aspects affecting the significance of future reports, such as:

1. Whether the facility 108 will take the reporting time to be the time of the clock 188, in which case the module 106 includes this time in the message, or whether the clock 188 is pre-synchronized with the clock 120 at the facility 108.
2. Which messages will utilize reporting time to convey additional information. In the illustrated example, only "registration" messages are used in this fashion.
3. What significance is assigned to which times. In the illustrated examples, reporting times occurring at even minutes after the hour (such as 12:42) mean that the module 106 deems coverage by the network 102 to be "good," whereas reporting times occurring at odd minutes after the hour (such as 12:57) mean that the module 106 deems coverage to be "unknown." In the present example, the presence of "coverage" means that the module 106 is within range of a network's cellular communication equipment; the module's transceiver 106a is approved, contracted, or otherwise subscribed to that network; and that the MICROBURST system of AERIS.NET is operable in this network, as described above.

In step 402, the mobile reporting module 106 wakes. This may occur due to a previous power-off, re-boot, software reset, or other such condition. After step 402, the module 106 "listens" to broadcasts of the network 102 (step 404), since the identity of the surrounding cellular network 102 changes as the module 106 travels. As the identity of the networks changes, so does coverage, since financial arrangements might (or might not) have been made with each network to provide communications coverage to the module 106. The module 106 monitors broadcasts from the network 102 for a coverage code, which may also be known in the art as a "SID," or a System Identification code, etc.

When a coverage code is received, module 106 analyzes coverage by referencing this coverage code against the coverage record 107 to determine whether the current coverage code indicates good, bad, or unknown coverage (step 405). Step 406 proceeds accordingly. Namely, if coverage is good, processing advances to step 408, where the mobile unit 106 (optionally) determines whether certain registration criteria have been met. For instance, these criteria may include a review of whether the module 106 has already registered its presence with the network 102. If the registration criteria are not met, the routine 400 returns to step 404. Otherwise, if registration is warranted, processing proceeds to step 410, where the module 106 transmits a registration message. The registration message functions to inform the cellular infrastructure of the general location and availability of module 106. To serve this purpose, the registration message generally includes an identifier (ID) of the module 106 at minimum, and may include further information such as a mobile identification number (MIN), electronic serial number (ESN), or other information generally known by those skilled in the art. Importantly, the module 106 transmits the registration message during an even minute past the hour, such as 6:36 as indicated by the clock 188. If the facility 108 lacks the clock 120, or does not have the clock 120 synchronized with the clock 188, the registration message includes the registration time according to the clock 188.

After step 410, the facility 108 receives then analyzes the registration message received from the module 106 (step 412). Particularly, the facility 108 determines by its content that the message concerns registration, and by its transmission time that it indicates known good coverage. The facility 108 takes the time of receiving the message according to its own clock 120 (if so equipped) as the transmission time, or alternatively the time imprinted upon the message by the module 106. Since the reporting time of the message indicates known good coverage, the facility 108 refrains from sending any acknowledgment ("ack"), conserving transmission bandwidth for other messages.

In contrast to the foregoing, step 406 returns to step 404 if the current state of coverage is "bad." If coverage is "unknown," processing advances to step 414, where the module 106 transmits a registration message. Importantly, the module 106 transmits the registration message during an odd minute past the hour, such as 6:37 as indicated by the clock 188; this differentiates from registration messages under conditions of "good" coverage. If the facility 108 lacks the clock 120 or does not have the clock synchronized with the clock 188, the registration message of step 414 includes the registration time according to the clock 188. After step 414, the facility 108 receives then analyzes the registration message received from the module 106 (step 416). Particularly, the facility 108 determines by its content that the message concerns registration, and by its transmission time that it indicates "unknown" coverage availability. The facility 108 takes the time of receiving the message according to its own clock 120 (if so equipped) as the transmission time, or alternatively the time imprinted upon the message by the module 106. Since the message's reporting time indicates unknown coverage availability, the facility 108 returns an acknowledge message confirming that coverage is good. In response, the module 106 may update the coverage record to associate the coverage code (from step 404) with "good" coverage (step 418). After step 418, the routine 400 returns to step 404.

Operating Sequence—Appending Data to Coverage Query

Figure 5:
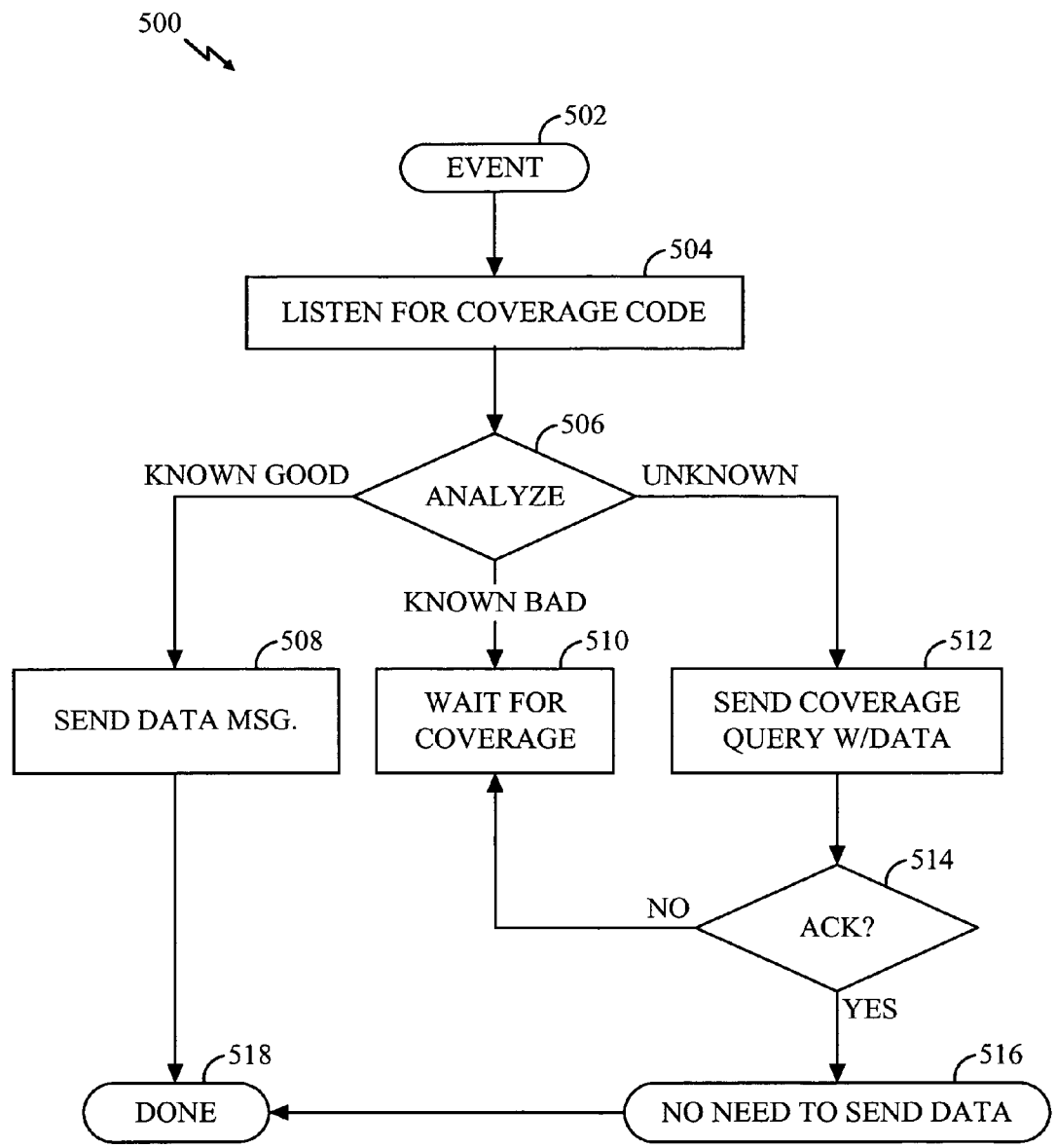
FIG. 5 is a flowchart of an operating sequence for consolidating data with coverage query transmission under unknown coverage conditions, according to the invention.

FIG. 5 shows a sequence 500 to illustrate another example of the method aspect of the present invention. This sequence 500 describes a process for communications between mobile reporting modules (such as 106) and the monitoring facility 108, where the remote module responds to unknown coverage by combining data with a coverage query in order to reduce the number of messages sent, and to save the need to subsequently transmit the data in the event the monitoring facility confirms coverage. For ease of explanation, but without any intended limitation, the example of FIG. 5 is described in the context of FIGS. 1–3, described above.

In step 502, an "event" occurs requiring the module 106 to transmit a message reporting the event to the facility 108. Events requiring reporting are prearranged by programming of the module 106, and may include various particulars as to trailer empty or not empty, report door open/closed, battery condition, GPS position, etc. Accordingly, the message may include status messages as well as data. After step 502, the module 106 monitors broadcasts from the network 102 for a coverage code, in the manner discussed above (step 404, FIG. 4).

When a coverage code is received, the module 106 analyzes coverage by referencing this coverage code against the coverage record to determine whether the current coverage code indicates good, bad, or unknown coverage (step 506). Then, if coverage is good, step 506 advances to step 508, where the mobile unit 106 transmits a representation of the event of step 502 and any related data. After step 508, the routine 500 ends in step 518.

In contrast to the foregoing, if coverage is known "bad," step 506 proceeds to step 510, where the module 106 waits for coverage to resume. If coverage is "unknown," step 506 advances to step 512, where the module 106 transmits a coverage query with a message representing the event of step 502 and any related data. Transmitting the coverage query with this message reduces number of transmissions from module 106 resulting in lower transmission costs and savings in battery power.

In one embodiment, the coverage query may be represented by a component of the message itself. For instance, if the status message comprises a binary code representing status conditions (e.g., trailer empty or not empty, report door open/closed, battery condition, etc.), the coverage query may be included as a status bit in this binary status message. Alternatively, if the number of bits in the code are limited, the coverage query may be combined with other status items. As an example, the second bit in the code may indicate "coverage query plus door open" if binary "one."

After step 512, the module 106 asks whether an ack has been received from the facility 108. If not, this means that the coverage query has not been answered, and the module 106 proceeds to step 510. In this case, coverage remains unknown. On the other hand, if the message of step 512 is acknowledged, this means that coverage is confirmed and the facility 108 has confirmed receipt of the message. Accordingly, there is no need for the module 106 to send the status message (step 516) since the combined status message and coverage query succeeded. After step 516, the routine ends in step 518.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

I claim:

1. A data collection system, comprising:
a monitoring facility in communication with a wireless communications network and programmed to recognize received messages transmitted by a mobile reporting module at first prearranged times to mean that the mobile reporting module has deemed coverage by the network to be available, and to recognize received messages transmitted by the mobile reporting module at second prearranged times to mean that the mobile reporting module has deemed coverage by the network to be unknown;
one or more mobile reporting modules programmed to re-register with the monitoring facility via a wireless communications network by performing operations comprising:
determining whether or not wireless coverage is available via the wireless network;
if the coverage is determined to be available, transmitting a registration request upon one of the first prearranged times;
if coverage is determined to be unavailable, refraining from transmitting the registration request; and
if the coverage availability is unable to be determined, transmitting a registration request upon one of the second prearranged times.

2. The system of claim 1, where:
the mobile reporting module and monitoring facility include separate, synchronized time clocks;
the mobile reporting module is programmed such that the operation of transmitting a registration request upon one of the first prearranged times comprises transmitting the registration request upon one of the first prearranged times as indicated by the time clock of the mobile reporting module;
the mobile reporting module is programmed such that the operation of transmitting a registration request upon one of the second prearranged times comprises transmitting the registration request upon one of the first prearranged times as indicated by the time clock of the mobile reporting module;
the monitoring facility is programmed such that the operation of analyzing which of the first and second prearranged times the mobile reporting module transmitted the registration request upon comprises referencing a time of receipt of the registration request according to the time clock at the monitoring facility.

3. The system of claim 1, where:
the mobile reporting module is programmed such that the operation of the mobile reporting module transmitting registration requests further includes transmitting a time of transmission; and
the monitoring facility is programmed such that the operation of the monitoring facility analyzing which of the first or second prearranged times the mobile reporting module transmitted the registration request comprises analyzing the time of transmission.

4. The system of claim 1, the mobile reporting module being programmed such that the operation of attempting to determine whether wireless coverage is available via the wireless network comprises:
monitoring transmissions from the wireless communications network for a coverage code, and upon receipt of the coverage code, referencing a coverage code history record to determine whether the received coverage code indicates that wireless coverage is available.

5. The system of claim 1, where the monitoring facility is further programmed to perform operations comprising:
responsive to receiving the registration request from the mobile reporting module, the monitoring facility determining whether the mobile reporting module determined coverage to be available by analyzing which of the first or second prearranged times the mobile reporting module transmitted the registration request.

6. The system of claim 1, where:
the mobile reporting module includes a clock;
the first prearranged times comprise even minutes after hours indicated by the clock; and
the second prearranged times comprise odd minutes after hours indicated by the clock.

7. A data collection system, comprising:
monitoring means, in communication with a wireless communications network, for recognizing received messages transmitted by a mobile reporting module at first prearranged times to mean that the mobile reporting module has deemed coverage by the network to be available, and for recognizing received messages transmitted by the mobile reporting module at second prearranged times to mean that the mobile reporting module has deemed coverage by the network to be unknown;
mobile reporting means for registering with the monitoring means via a wireless communications network by;
determining whether wireless coverage is available via the wireless network;
if the coverage is determined to be available, transmitting a registration request upon one of the first prearranged times;
if coverage is determined to be unavailable, refraining from transmitting the registration request; and
if the coverage availability is unable to be determined, transmitting a registration request upon one of the second prearranged times.

8. A method for operating a mobile reporting module to register with a monitoring facility via a wireless communications network, comprising operations of:
the mobile reporting module determining whether or not wireless coverage is available via the wireless network;
if the coverage is determined to be available, the mobile reporting module transmitting a registration request at a first prearranged time;
if coverage is determined to be unavailable, the mobile reporting module refraining from transmitting the registration request; and
if the coverage availability is unable to be determined, the mobile reporting module transmitting a registration request at a second prearranged time.

9. The method of claim 8, the operation of the mobile reporting module attempting to determine whether wireless coverage is available via the wireless network comprising:

monitoring transmissions from the wireless communications network for a coverage code, and upon receipt of the coverage code, referencing a coverage record to determine whether the received coverage code indicates that wireless coverage is available.

10. The method of claim 8, the operations further comprising:

responsive to receiving the registration request from the mobile reporting module, the monitoring facility determining whether the mobile reporting module determined coverage to be available by analyzing which of the first or second prearranged times the mobile reporting module transmitted the registration request.

11. The method of claim 10, wherein:

the mobile reporting module and monitoring facility including separate time clocks, and the operations further comprise synchronizing the time clocks before the operation of the mobile reporting module attempting to determine whether wireless coverage is available via the wireless network;

the operation of the mobile module transmitting a registration request upon one of the first prearranged times comprises transmitting the registration request upon one of the first prearranged times as indicated by the time clock of the mobile reporting module;

the operation of the mobile module transmitting a registration request upon one of the second prearranged times comprises transmitting the registration request upon one of the first prearranged times as indicated by the time clock of the mobile reporting module;

the operation of the monitoring facility analyzing which of the first and second prearranged times the mobile reporting module transmitted the registration request upon comprises referencing a time of receipt of the registration request according to the time clock at the monitoring facility.

12. The method of claim 10, wherein:

the operation of the mobile reporting module transmitting registration requests further includes transmitting a time of transmission; and the operation of the monitoring facility analyzing which of the first or second prearranged times the mobile reporting module transmitted the registration request upon comprises reviewing the time of transmission.

13. The method of claim 8, wherein: the first prearranged time comprises an even minute past any hour; and the second prearranged time comprises an odd minute past any hour.

* * * * *